US008857842B2

(12) United States Patent
Antonot

(10) Patent No.: US 8,857,842 B2
(45) Date of Patent: Oct. 14, 2014

(54) BICYCLE REAR SUSPENSION

(76) Inventor: Emmanuel Antonot, Clenay (FR)

(*) Notice: Subject to any disclaimer, the term of this patent is extended or adjusted under 35 U.S.C. 154(b) by 0 days.

(21) Appl. No.: 13/456,150

(22) Filed: Apr. 25, 2012

(65) Prior Publication Data

US 2012/0223504 A1   Sep. 6, 2012

Related U.S. Application Data

(63) Continuation of application No. 12/225,083, filed as application No. PCT/EP2007/052474 on Mar. 15, 2007, now abandoned.

(30) Foreign Application Priority Data

Mar. 15, 2006   (FR) ...................................... 06 02271

(51) Int. Cl.
  *B62K 25/12*   (2006.01)
  *B62K 25/28*   (2006.01)
(52) U.S. Cl.
  CPC .................................... *B62K 25/286* (2013.01)
  USPC ....................................................... 280/284
(58) Field of Classification Search
  USPC ............................ 280/284, 285, 286; 180/227
  See application file for complete search history.

(56) References Cited

U.S. PATENT DOCUMENTS

| | | | |
|---|---|---|---|
| 3,917,313 A | 11/1975 | Smith et al. |
| 4,058,181 A | 11/1977 | Buell |
| 5,332,246 A | 7/1994 | Buell |
| 5,409,249 A | 4/1995 | Busby |
| 5,441,292 A | 8/1995 | Busby |
| 5,509,679 A | 4/1996 | Leitner |
| 5,678,837 A | 10/1997 | Leitner |
| 5,957,473 A | 9/1999 | Lawwill |
| 6,056,307 A | 5/2000 | Busby et al. |
| 6,102,421 A | 8/2000 | Lawwill et al. |
| 6,199,886 B1 | 3/2001 | Guenther |
| 6,244,610 B1 | 6/2001 | Kramer-Massow |
| 6,378,885 B1 | 4/2002 | Ellsworth et al. |
| 6,386,567 B1 | 5/2002 | Schonfeld |
| 6,386,568 B1 | 5/2002 | Tribotte |
| 6,488,301 B2 | 12/2002 | Klassen et al. |
| 6,783,142 B1 | 8/2004 | Schober |
| 6,866,281 B2 | 3/2005 | D'Aluisio et al. |
| 7,048,292 B2 | 5/2006 | Weagle |
| 7,837,214 B2 | 11/2010 | Tribotte |
| 2002/0038944 A1 | 4/2002 | Lawwill et al. |
| 2003/0038450 A1 | 2/2003 | Lam |
| 2004/0145149 A1 | 7/2004 | Ellsworth et al. |
| 2005/0285367 A1 | 12/2005 | Chang et al. |

FOREIGN PATENT DOCUMENTS

| | | |
|---|---|---|
| DE | 4435482 | 4/1996 |
| DE | 19802429 | 8/1999 |
| DE | 102004032054 | 1/2006 |
| EP | 026073 | 8/2000 |
| WO | WO 98/18671 | 5/1998 |

*Primary Examiner* — Tony Winner
(74) *Attorney, Agent, or Firm* — Blakely Sokoloff Taylor & Zafman

(57) ABSTRACT

Rear suspension for a bicycle which includes a rear swing arm (15) which carries the hub (19) of the rear wheel (20) and pivots via at least two pivot points (23, 24) on a frame (1) carrying a bottom bracket (12). The swing arm (15) pivots about an instantaneous center of rotation (25) located close to the stretch upper length of the chain (21), or to the straight line extending on from it, in a position of static equilibrium. The instantaneous center of rotation moves inside a horizontal band (27) in such a way that the instantaneous center of rotation (25) moves horizontally and forwards when the swing arm (15) moves upwards as the wheel goes over an obstacle.

11 Claims, 6 Drawing Sheets

BICYCLE REAR SUSPENSION

CROSS-REFERENCE TO RELATED APPLICATION

Figure 1:
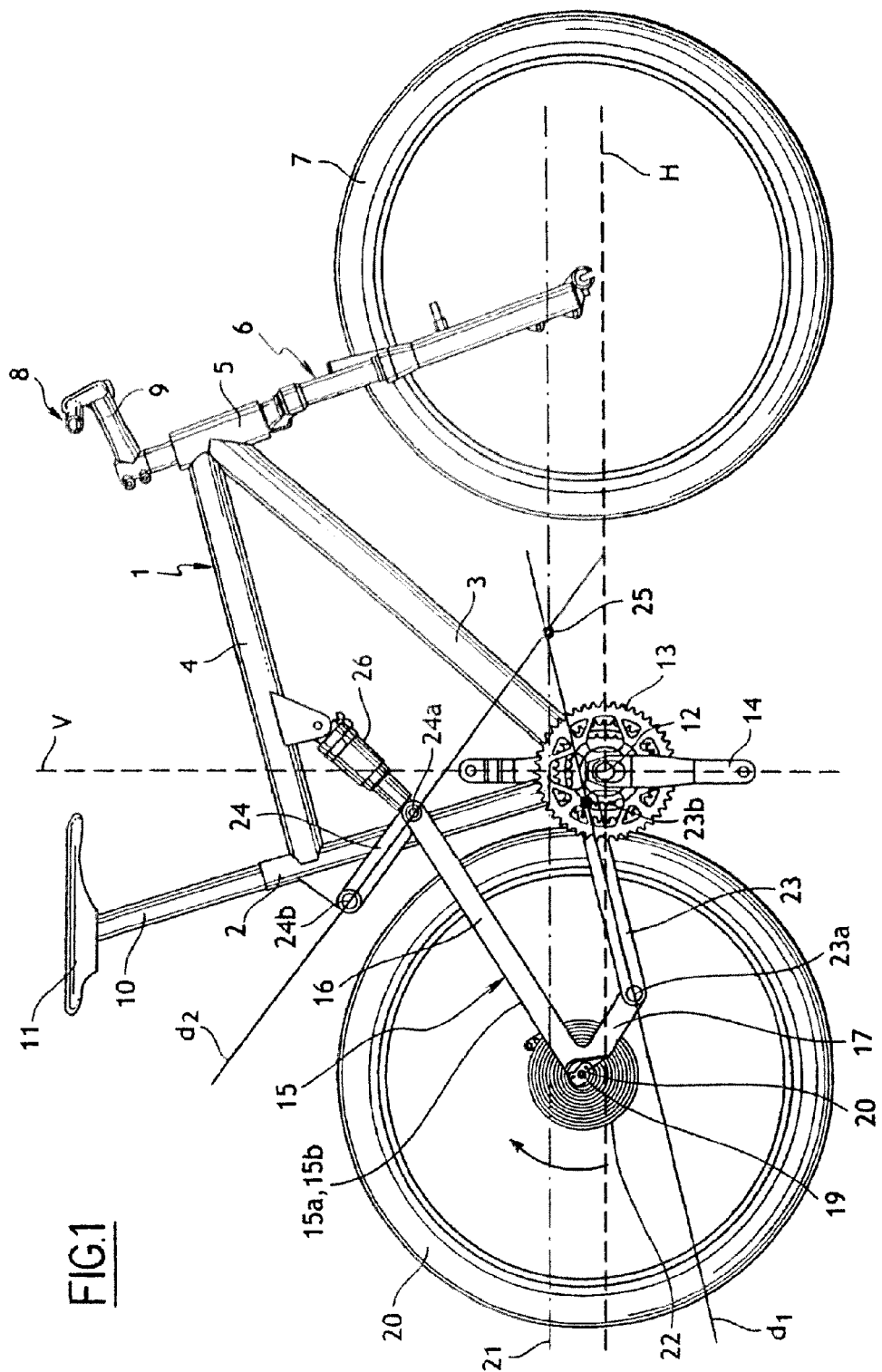

The present patent application is a Continuation Application claiming the benefit of application Ser. No. 12/225,083, filed Sep. 12, 2008 now abandoned, which Application claims the benefit of Application No PCT/EP2007/052474, filed Mar. 15, 2007.

The present invention relates to an enhancement to a rear suspension of a vehicle such as a bicycle, a motorcycle, or the like, of the type including a chassis, a swing arm integral with the frame and bearing the axle of the hub of a driving rear wheel and a shock absorber, the ends of which are secured to the frame and to the swing arm or to a connecting rod, respectively, said suspension providing a so-called anti-pumping effect.

All terrain mountain bikes so-called ATBs which include a rear suspension consisting of a articulated swing arm at the lower portion of the saddle tube cooperating with a shock absorber are well known. Said swing arm pivots around a fixed axis parallel to the axis of the driving sprocket wheel which is borne by the crankset bottom bracket positioned on the lower end of the frame, i.e. at the intersection of the oblique tube and of the saddle tube of the latter.

Moreover, the ends of the shock absorber are secured to the swing arm and respectively to the horizontal tube connecting the saddle tube to the fork of the bicycle, or to an intermediate tube globally extending from the crankset bottom bracket to the horizontal tube, said saddle tube being interrupted in order to let through the shock absorber.

This type of rear suspension under the action of an energetic pedal kick such as a pedal kick for restarting the bicycle or when the cyclist adopts the so-called standing position on the pedals, causes a so-called pumping effect which is expressed by cyclic sinking of the suspension even on a perfectly levelled ground. This type of rear suspension therefore has the drawback of dissipating a portion of the driving torque provided by the cyclist into the shock absorber instead of participating in the drivability of the bicycle.

All terrain bicycles are also known, so-called ATBs, the rear suspension of which consists of a swing arm articulated to the saddle tube and/or to the oblique tube of the frame by means of two connecting rods or the like, said swing arm or at least one of the connecting rods cooperating with a shock absorber. Said swing arm thus pivots around a mobile virtual pivot point, also called instantaneous centre of rotation, which corresponds to the intersection of the straight lines passing through the respective axes of the connecting rods.

This is the case of the American Patent Application US 2002/0109332, for example, which describes such a bicycle rear suspension. The instantaneous centre moves in the lower front quadrant and moves from front to rear and from top to bottom when the swing arm moves upwards when going over an obstacle such as a bump for example.

Such a rear suspension with an instantaneous centre of rotation, also called a virtual pivot point, has the drawback of providing a so-called pumping effect.

One of the objects of the invention is therefore to find a remedy to the drawback, by proposing a rear suspension of a vehicle such as an ATB or the like, of simple and inexpensive design providing an anti-pumping effect.

For this purpose, and according to the invention, a rear suspension of a bicycle including a rear swing arm bearing the hub of the rear wheel and articulated by at least two articulation means to a frame bearing a crankset bottom bracket, said bicycle including transmission chain extending between a driving sprocket wheel, a so-called chain ring, secured to the crankset bottom bracket and a driven sprocket wheel secured to the axle of the hub of the rear wheel, and the swing arm pivoting around an instantaneous centre of rotation corresponding to the intersection of the straight lines passing through the axes of rotation of the respective articulation means of the swing arm; said suspension is remarkable in that said instantaneous centre of rotation is located close to the upper strand of the chain in a position of static equilibrium and moves inside a horizontal band so that said instantaneous centre moves horizontally when the swing arm moves upwards upon going over an obstacle.

Such a trajectory of the instantaneous rotation centre provides an anti-pumping effect by creating a restoring moment tending to bring the swing arm back into its position of static equilibrium upon pedalling.

The band is delimited by an upper straight line and a lower straight Line extending above and respectively below the upper strand of the chain, or the straight line which extends on from it, in a position of static equilibrium.

Moreover, the distance separating the upper straight line from the lower straight line of the band is less than or equal to half the maximum vertical displacement of the hub of the rear wheel.

Said distance between said instantaneous centre and the upper strand of the transmission chain, or the straight line which extends on from it, increases when the swing arm moves upwards.

Preferably, the distance between said instantaneous centre and the upper strand of the transmission chain, or the straight line which extends on from it, increases linearly when the swing arm moves upwards.

The instantaneous centre or rotation follows a linear trajectory when the swing arm moves.

According to an alternative embodiment of the suspension according to the invention, the distance between said instantaneous centre and the upper strand of the transmission chain, or the line which extends on from it, increases non-linearly when the swing arm moves upwards.

Figure 2:
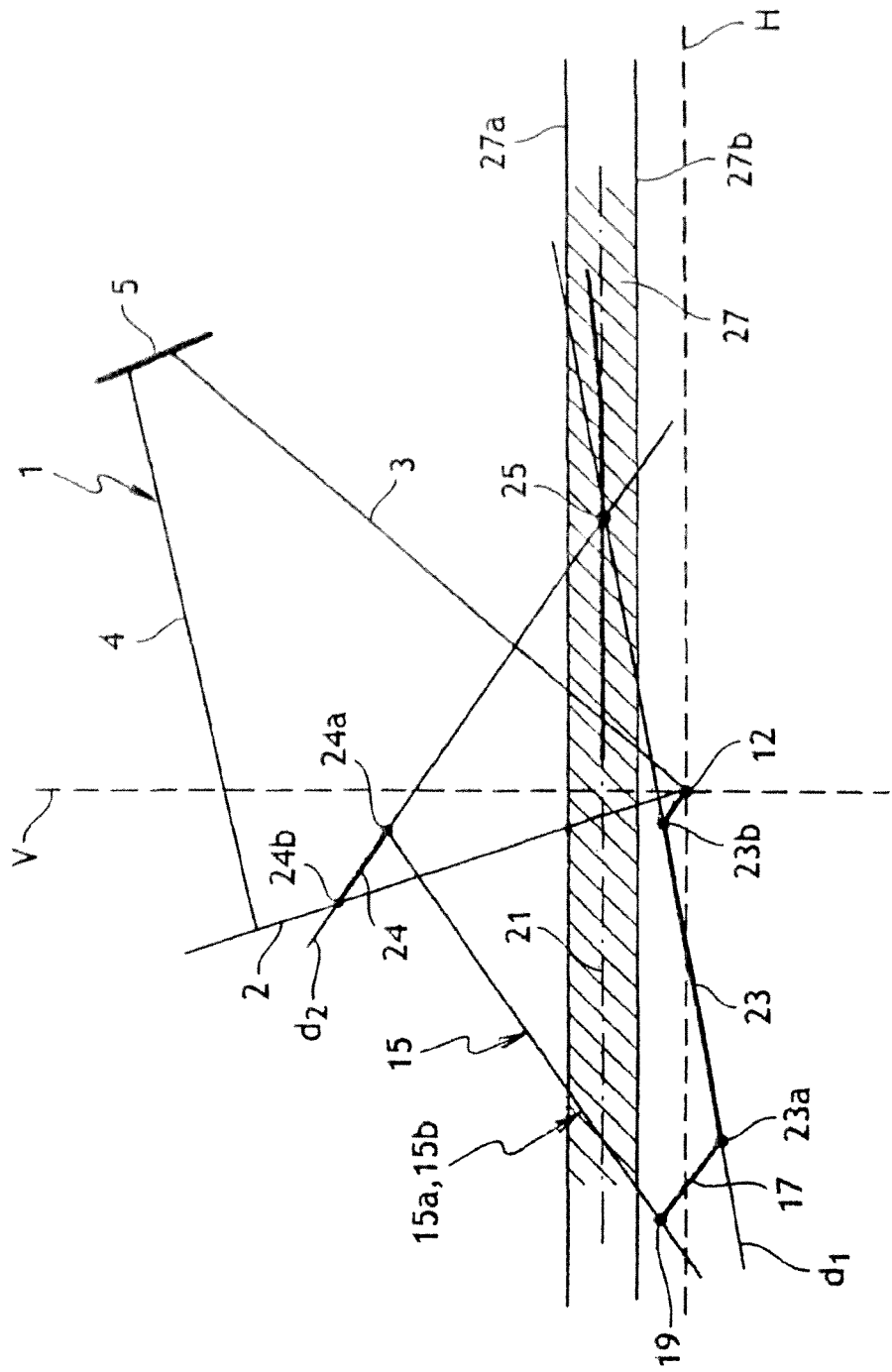
Figure 3:
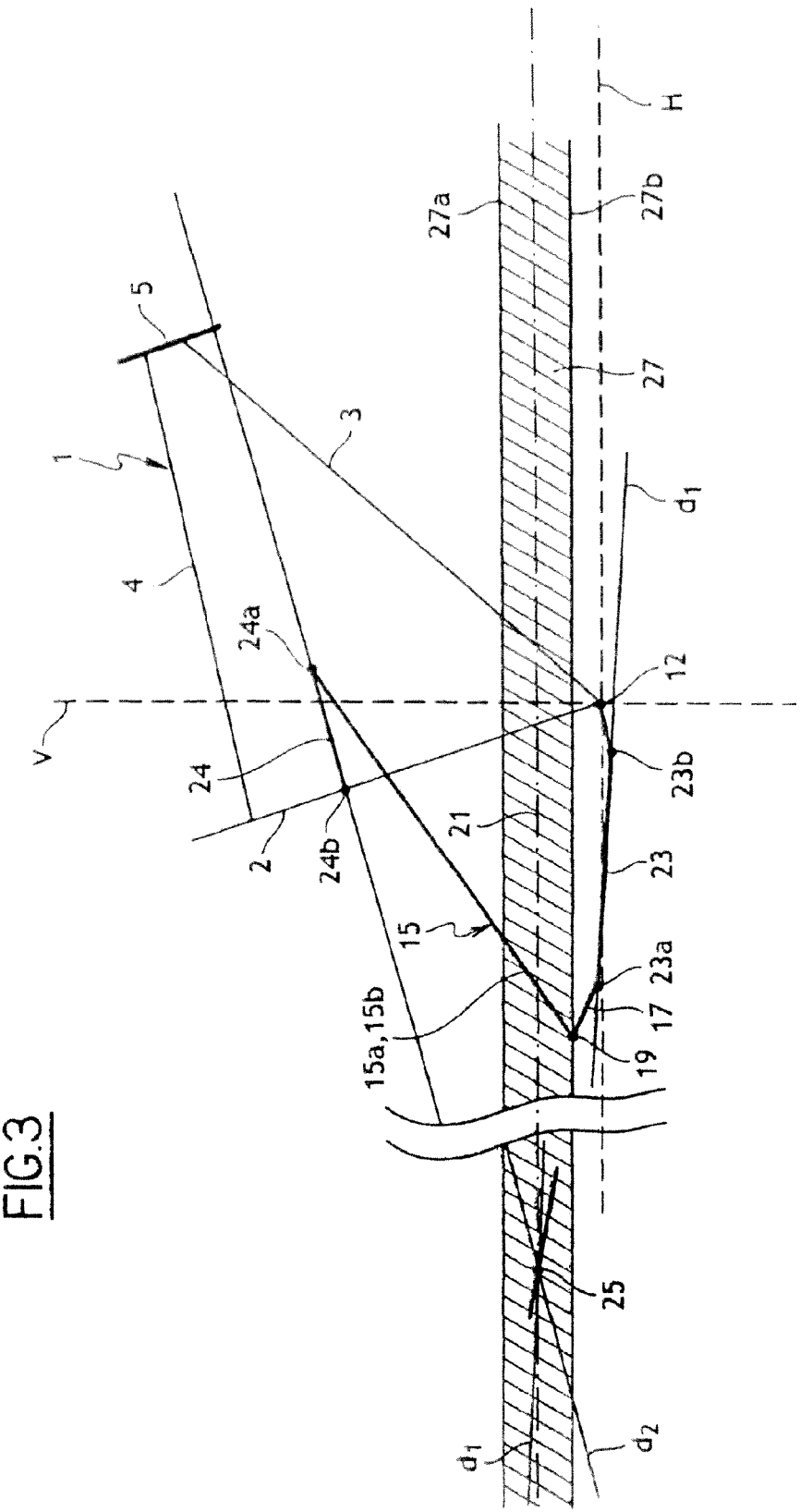
Figure 4:
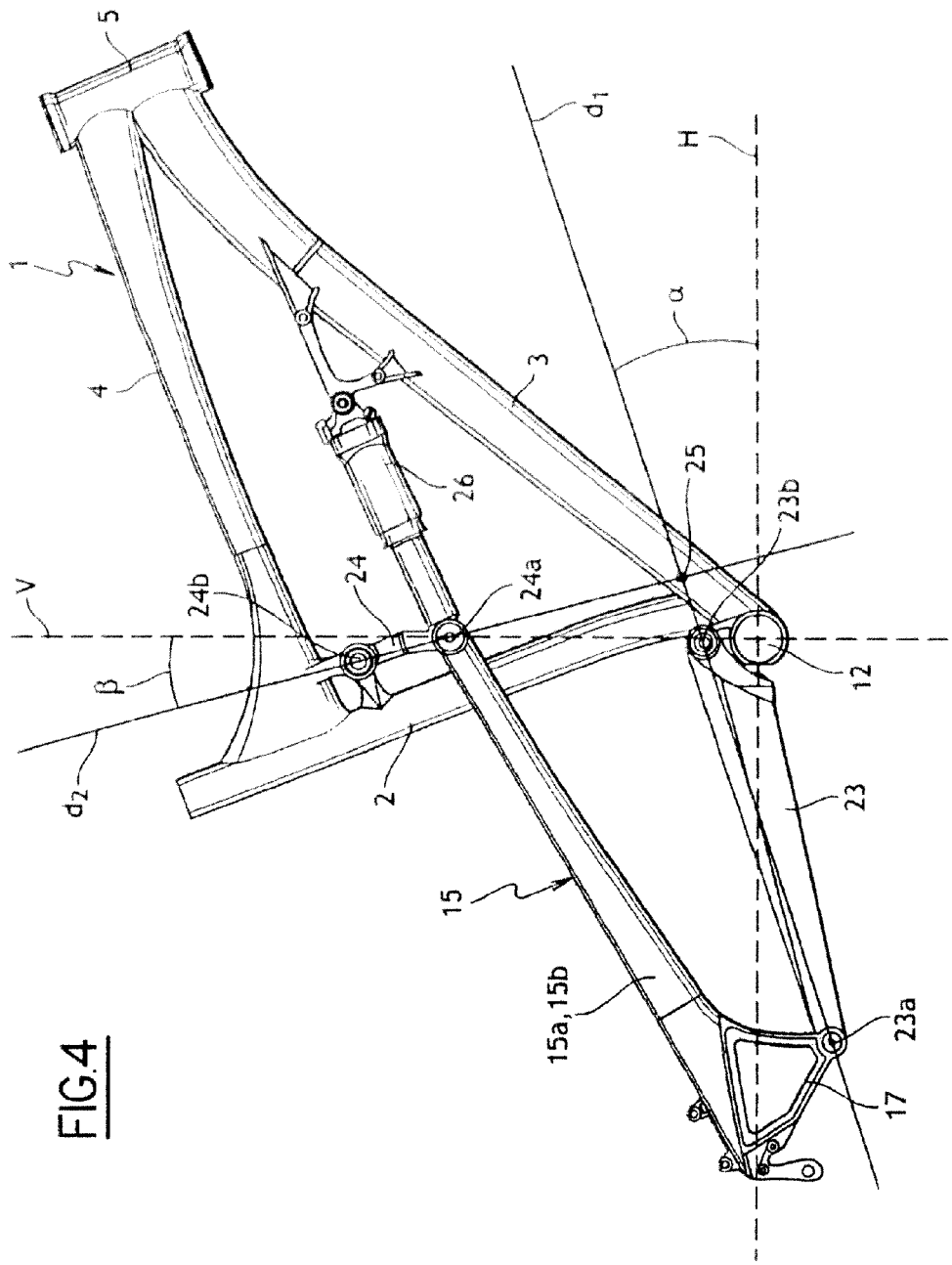
Figure 5:
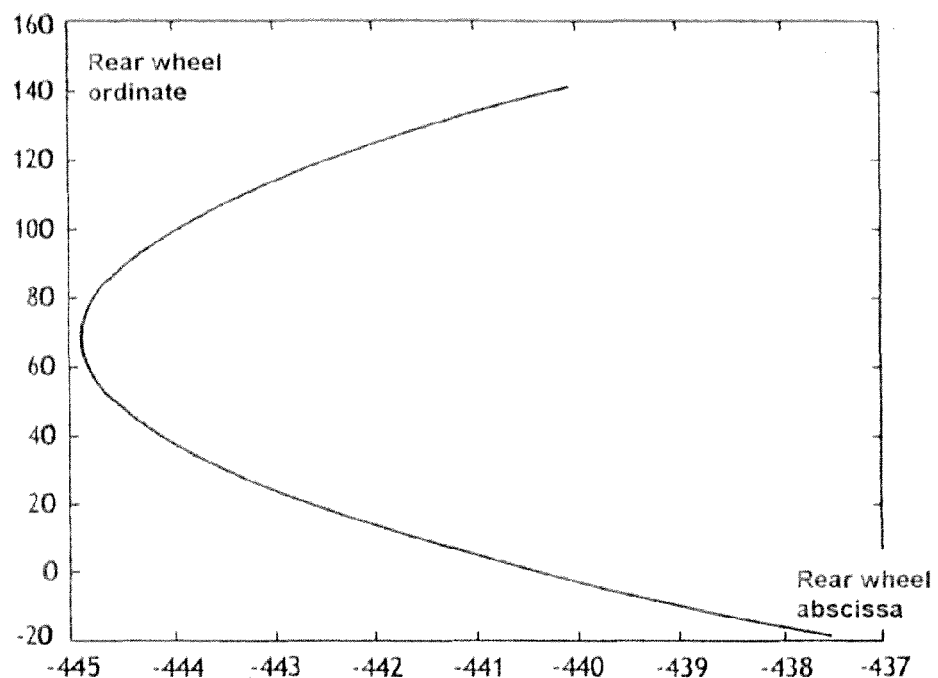
Figure 6:
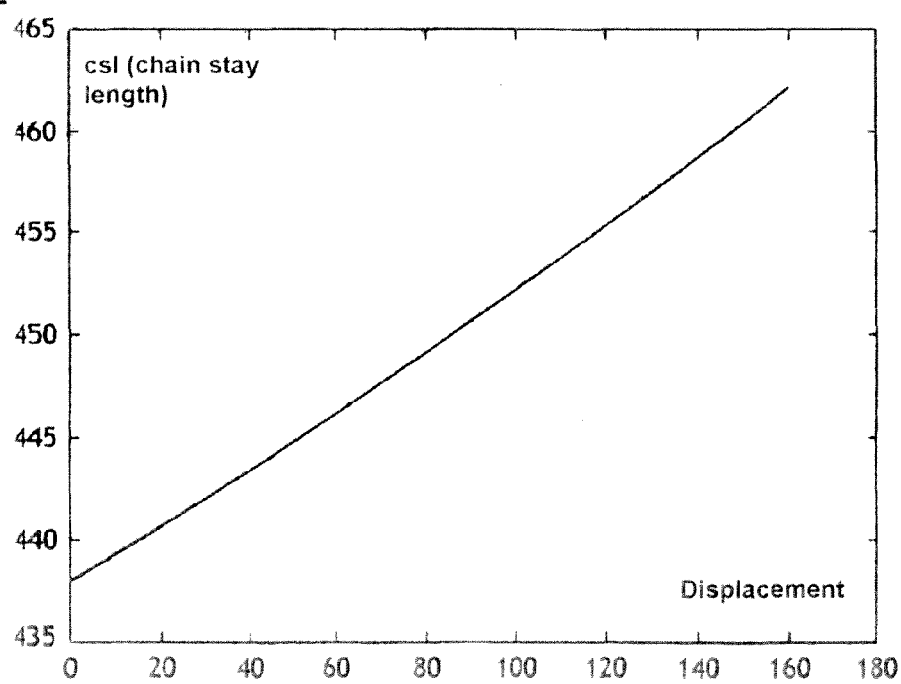
Figure 7:
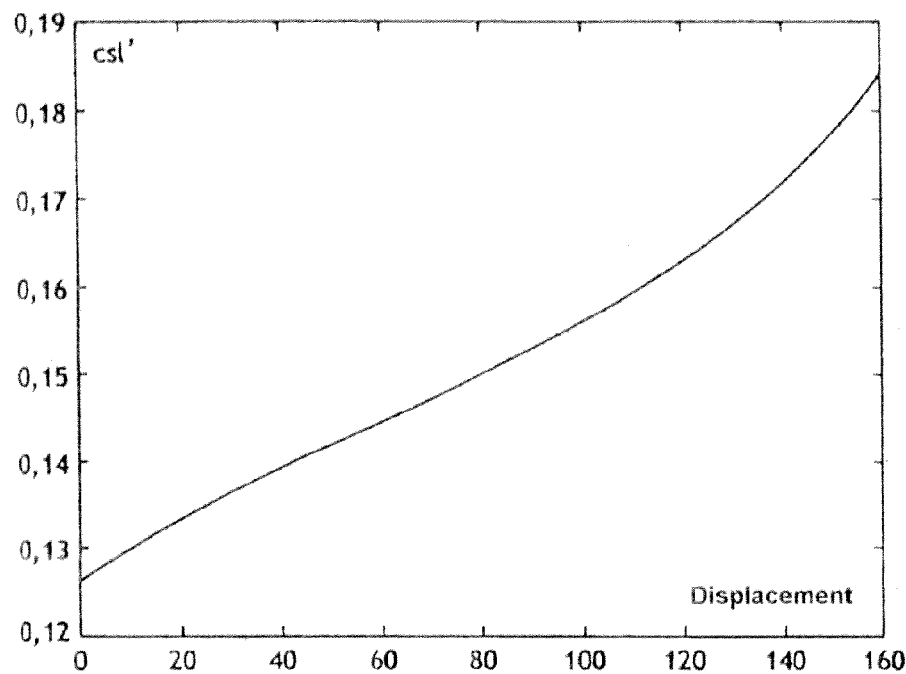
Figure 8:
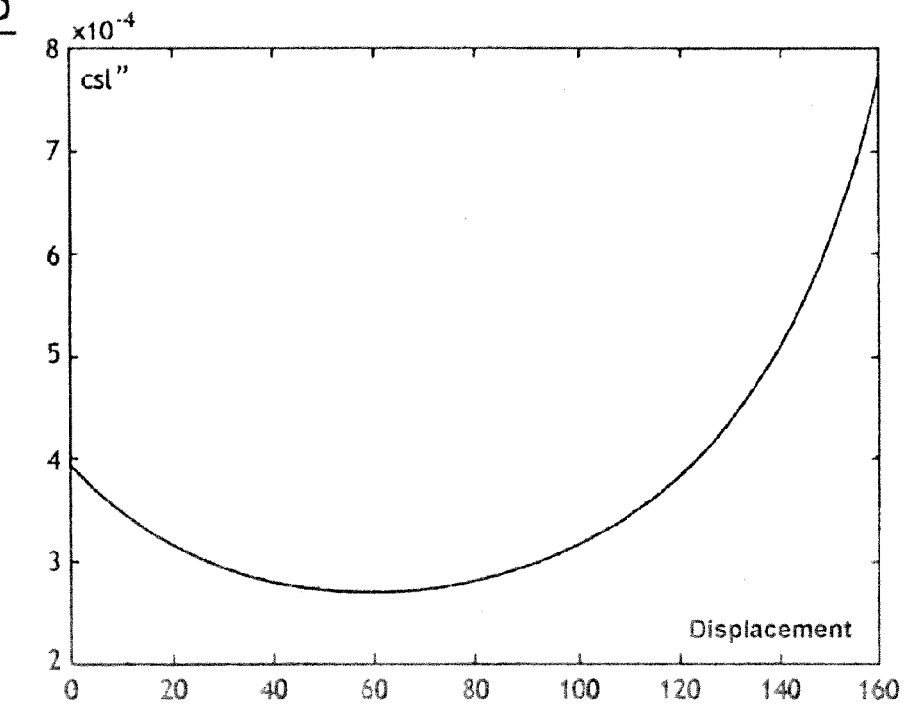

Other advantages and characteristics will become better apparent from the description which follows, of several alternative embodiments, given as non-limiting examples, of the rear suspension according to the invention, with reference to the appended drawings wherein:

FIG. 1 is a partial side view of a bicycle equipped with a rear suspension according to the invention, only the frame and the swing arm being illustrated, FIG. 2 is a schematic illustration of a bicycle equipped with the rear suspension according to the invention illustrated in FIG. 1, FIG. 3 is a schematic illustration of a bicycle equipped with an alternative embodiment of the rear suspension according to the invention, FIG. 4 is a schematic illustration of the frame of a bicycle equipped with another alternative embodiment of the rear suspension according to the invention, FIG. 5 is a curve illustrating the trajectory of the rear wheel of the bicycle equipped with a rear suspension according to the invention when the rear wheel encounters an obstacle, FIG. 6 is a curve illustrating the chain stay length CSL versus the displacement D of the rear wheel when the latter encounters an obstacle, FIG. 7 is a curve illustrating the first derivative of the chain stay length CSL versus the displacement D of the rear wheel, FIG. 8 is a curve illustrating the second derivative of the chain stay length CSL versus the displacement D of the rear wheel.

As a non-limiting example, a rear suspension of a bicycle of the all terrain mounting bike type (ATB) will be described hereafter; nevertheless, the rear suspension according to the invention may be adapted to any other vehicle without however departing from the scope of the invention.

With reference to FIG. 1, the ATB comprises a chassis 1 a so-called diamond-pattern frame consisting of a globally vertical saddle tube 2, of an oblique tube 3 assembled by welding to the lower end of the saddle rube 2 and of a horizontal tube 4, the ends of which are assembled by welding to the upper end of the saddle tube 2 and respectively to a globally vertical fork tube 5, the oblique tube 3 being moreover secured to said fork tube 5 also by welding. This fork tube 5 receives a fork 6 of the telescopic type, bearing at its lower end the axle of the hub of the front wheel 7 of the ATB. A handlebar 8 is conventionally secured to the distal end of a stem 9 secured to the upper end of the fork 6 in order to provide steering of the ATB.

The saddle tube 2 is capable of receiving a saddle post 10 comprising at its upper end a saddle 11 on which the cyclist takes up position.

It is obvious that the different saddle 2, oblique 3, horizontal 4 and fork 5 tubes of the frame 1 may be assembled by any suitable means well known to one skilled in the art such as by adhesive bonding and/or by fitting them together for example.

The lower end of said saddle tube 2, i.e. the intersection of the oblique tube 3 and of said saddle tube 2, includes a crankset bottom bracket 12 conventionally bearing the axle of the driving sprocket wheels 13, commonly called chain rings, for which the axes of rotation ore coaxial. Pedals 14 are secured to the axle of the driving sprocket wheels 13 on either side of the frame 1 of the ATB.

Said ATB moreover includes a swing arm 15 consisting of two V-shaped assemblies 15a, 15b, extending on either side of the middle plane of the frame 1. Said assemblies 15a, 15b are connected through one or more spacers not illustrated in FIG. 1. Each assembly 15a, 15b of the swing arm 15 consists of an oblique tube 16, a so-called stay, and of a lower tube 17 connected two by two by welds. The intersection of the stay 16 and of the lower tube 17 bears the axle 18 of the hub 19 of the rear wheel 20.

Conventionally, said rear wheel 20 is driven into rotation by a transmission chain 21 extending between the driving sprocket wheel 13 of the crankset bottom bracket 12 and the driven sprocket wheel 22 borne by the axle 18 of the hub 19 of the driving rear wheel 20, when the cyclist pedals.

It is obvious that the swing arm 12 may have any shape such as a triangular or globally rectilinear shape without departing from the scope of the invention.

Said swing arm 15 is secured to the frame 1 by two articulation means 23 and 24.

The first articulation means 23 consists in a so-called lower connecting rod 23, the axes of rotation 23a and 23b of which, positioned at the free ends of said connecting rod 23, are articulated to the distal end of the lower tube 17 of the swing arm 15 and to the saddle tube 2 close to the crankset bottom bracket 12, respectively. This lower connecting rod 23 globally extends horizontally at the rear of the saddle tube 2 of the frame 1 of the ATB when the latter is in a position of static equilibrium, i.e. when an average weight cyclist takes up position on the saddle of the ATB. By average weight cyclist is meant a cyclist with any weight for which a shock absorber has been adjusted depending on his/her weight according to the recommendations from the manufacturer. More specifically, said lower connecting rod 23 is slightly tilted from top to bottom and from front to rear, farming an angle α comprised between 0 and 10°, and preferably of about 5°, with the horizontal H illustrated in dotted lines in FIG. 1.

The second articulation means 24 consists in a so-called upper connecting rod 24, the axes of rotation 24a and 24b of which, positioned at the free ends of said upper connecting rod 24, are articulated to the distal end of the stay 16 of the swing arm 15 and to the saddle tube 2 below the horizontal tube 4 of the frame 1, respectively. This upper connecting rod 24 globally extends vertically between the saddle tube 2 and the oblique tube 3 of the frame 1 of the ATB when the latter is in a position of static equilibrium. More specifically, said upper connecting rod 24 is tilted from top to bottom and from rear to front, forming an angle comprised between 30 and 60°, and preferably of about 45°, with the vertical V illustrated in dotted lines in FIG. 1.

The orientation of the lower connecting rod 23 and of the upper connecting rod 24 corresponds to the position of static equilibrium as illustrated in FIG. 1.

It is obvious that, when the bicycle is not under load, the orientation of the connecting rods 23 and 24 may differ by an angle which may reach 5° relatively to the orientation of said connecting rods 23 and 24 in the position of static equilibrium.

The instantaneous centre of rotation 25 defined by the intersection of the straight lines $d_1$ and $d_2$ passing through the axes 23a, 23b of the lower connecting rod 23 and through the axes 24a, 24b of the upper connecting rod 24, respectively, is located in the upper front quadrant of the frame 1.

In the position of static equilibrium, as illustrated in FIG. 1, said instantaneous centre of rotation 25 is located on the straight line extending on from the upper strand of the transmission chain 21.

Moreover, when the rear wheel 20 encounters an obstacle, the swing arm 15 moves upwards, driving into rotation the lower connecting rod 23 in a clockwise direction and the upper connecting rod 24 in an anticlockwise direction. The instantaneous centre of rotation 25 then moves forwards along a slightly curvilinear trajectory, i.e. a curvilinear trajectory having a large radius of curvature, the concavity of which is oriented upwards.

It will be observed that, depending on the ratio on the lengths of the lower 23 and upper 24 connecting rods, on the position of said connecting rods 23 and 24 in a position of static equilibrium, notably, the instantaneous centre of rotation 25 may move along a globally rectilinear and horizontal trajectory.

Moreover, it is obvious that the instantaneous centre of rotation 25 may, in a position of static equilibrium, be located close to the upper strand of the transmission chain 21, or to the straight line extending on from said strand of the chain 21, i.e. located just above or just below the upper strand of the transmission chain 21, or the straight line which extends on from it.

Finally, the ATB comprises a shock absorber 26, the free ends of which are secured to the horizontal tube 4 and to the distal end of the stay 16 of the swing arm 15 or of the upper connecting rod 24, respectively.

It is obvious that the adjustment of the shock absorber will be carried out depending on the weight of the cyclist. This adjustment usually consists of adapting the pressure of the shook absorber according to the weight so that said shock absorber is in its "sag" position when the cyclist takes up position on the bicycle. By "sag" is meant the minimum sinking position of the shock absorber.

Now the operation of the ATB equipped with the rear suspension according to the invention will be explained with reference to FIGS. 1 and 2.

In the position of static equilibrium, the instantaneous centre of rotation 25 is located on the straight line extending on from the upper strand or the transmission chain 21 in the upper front quadrant as seen earlier.

When the axle of the hub 19 of the rear wheel 20 moves upwards, as shown by the arrow a of FIGS. 1 and 2, the lower connecting rod 23 pivots in the clockwise direct and the upper connecting rod 24 pivots in the opposite direction. The instantaneous centre of rotation 25 then moves forwards along a globally horizontal and slightly curvilinear trajectory, the concavity of which is oriented upwards. The instantaneous centre of rotation 25 moves within a horizontal band 27, said band 27 being delimited by an upper straight line 27a and a lower straight line 27b extending above and respectively below the upper strand of the chain 21, or the line which extends on from it, in a position of static equilibrium.

It will be observed that, in this particular exemplary embodiment, the upper strand of the transmission chain 21 and the band 27 in which moves the instantaneous centre of rotation, extend horizontally. However, it is obvious that the upper strand of the chain 21 and consequently the band 23 may be tilted without however departing from the scope of the invention.

The distance separating the upper straight line 27a from the lower straight line 27b of the band 27 is less than or equal to the half, and preferably less than or equal to the quarter, of the maximum vertical displacement of the hub 19 of the rear wheel 20. As the vertical displacement of the hub 19 of the rear wheel 20 of an ATB is generally comprised between 80 mm and 200 mm, the distance separating the upper straight line 27a and lower straight line 27b of the band 27 is comprised between 40 and 100 mm, and preferably between 20 and 50 mm.

Moreover, when the axle of the hub 19 of the rear wheel 20 moves upwards, the upper strand of the transmission chain 21 and the line which extends on from it, pivots around the axis of the crankset bottom bracket 12 and is gradually tilted from top to bottom and from rear to front.

Thus, when the axle of the hub 19 of the rear wheel 20 moves upwards, the instantaneous centre of rotation 25 moves along its horizontal trajectory and is located above the strand of the transmission chain 21 or the straight line which extends on from it.

In this way, the distance between said instantaneous centre of rotation 25 and the upper strand of the transmission chain 21, or the straight line which extends on from it, increases when the swing arm 15 moves upwards. By distance is meant the length of the normal segment, i.e. orthogonal to the strand of the chain 21 or to the line extending on from said strand, separating the instantaneous centre of rotation from the upper strand of the chain 21 or the straight line which extends on from it. This distance globally increases linearly.

However, it is obvious that, for particular connecting rod lengths 23, 24, said distance may increase non-linearly without however departing from the scope of the invention.

Thus, during pedalling, a restoring moment proportional to the tension of the upper strand of the transmission chain 21 on the one hand and to the distance separating the instantaneous centre of rotation 25 from the upper length of the transmission chain 21 or from the straight line extending on from it on the other hand, is created. This restoring moment tends to bring the swing arm 15 back into its position of static equilibrium.

Therefore, the moment for restoring the swing arm 15 back to its static equilibrium position is regardless of its direction and at each instant opposed to the onset of the parasitic oscillatory motion, a so-called pumping movement generated by the pedalling movement of the cyclist.

Moreover, it will be observed that, in a position of static equilibrium, which corresponds to pedalling on a flat ground, the instantaneous centre of rotation 25 being located on the upper strand of the transmission chain 21, pedalling by the cyclist does not induce any moment so that the swing arm 15 remains in its position of static equilibrium.

According to an alternative embodiment of the ATB equipped with a rear suspension according to the invention, with reference to FIG. 3, the upper connecting rod 24 tilted from top to bottom and from rear to front, forming an angle comprised between 30 and 60° and preferably of about 45° with the vertical V, was replaced with a connecting rod 24 globally extending horizontally. Nevertheless, this upper connecting rod 24 is slightly tilted from top to bottom and from front to rear, forming an angle of about 85° with the vertical V and it does not extend parallel to the lower connecting rod 23.

The instantaneous centre of rotation 25 defined by the intersection of the straight lines $d_1$ and $d_1$ respectively passing through the axes 23a, 23b of the lower connecting rod 23 and through the axes 24a, 24b of the upper connecting rod 24 is located in the upper rear quadrant of the frame 1.

In the position of static equilibrium, as illustrated in FIG. 3, said instantaneous centre of rotation 25 is located on the straight line extending on from the upper strand of the transmission chain 21.

Moreover, when the rear wheel 20 encounters an obstacle, the swing arm 15 moves upwards driving into rotation the lower connecting rod 23 in a clockwise direction and the upper connecting rod 24 in an anticlockwise direction. The instantaneous centre of rotation 25 then moves under the upper strand of the transmission chain 21, at the rear of the hub 19 of the rear wheel 20, forwards along a slightly curvilinear trajectory, i.e. a curvilinear trajectory having a large radius of curvature, the concavity of which is oriented upwards.

It will be observed that, depending on the ratio of the lengths of the lower 23 and upper 24 connecting rods, on the position of said connecting rods 23 and 24 in the position of static equilibrium, the instantaneous centre of rotation 25 may notably move, at the rear of the hub 19 of the rear wheel 20, forwards or backwards along a globally rectilinear and horizontal trajectory.

Moreover, it is obvious that the instantaneous centre of rotation 25 may in the position of static equilibrium, be located close to the upper strand of the transmission chain 21, or to the straight line extending on from said strand of the chain 21, i.e. located just above or just below the upper strand of the transmission chain 21, or the straight line which extends on from it.

In the same way as previously, the distance between said instantaneous centre of rotation and the upper strand of the transmission chain 21, or the straight line which extends on from it, increases when the swing arm 15 moves upwards so that a restoring moment proportional to the tension of the upper strand of the transmission chain 21 on the one hand and to the distance separating the instantaneous centre of rotation 25 from the upper length of the transmission chain 21 or from the straight line which extends on from it, on the other hand, is created, said restoring moment tending to bring the swing arm 15 back into its position of static equilibrium upon pedalling.

Moreover, it is obvious that the swing arm 15 may consist in an arm of any shape, such as a globally rectilinear arm, for example, without however departing from the scope of the invention.

Further, the frame 1 may also have any shape such as the shape of a sloping V or a sloping L, for example.

The Lower 23 and upper 24 connecting rods forming the articulation means of the swing arm 15 on the frame 1 may be replaced with any other equivalent means such as an eccentric or a guide sliding on a rail for example.

At least one of the articulation means 23, 24 may follow a curvilinear trajectory, the radius of curvature of which increases and/or decreases, said curvilinear trajectory being superimposed with a spiral, parabola, hyperbola, or similar segment, the radius of curvature increasing and/or decreasing linearly or non-linearly.

According to a second alternative embodiment, with reference to FIG. 4, the ATB comprises in the same way as previously, a chassis 1, a so-called diamond frame, consisting of a globally vertical saddle tube 2, of an oblique tube 3 assembled by welding to the lower end of the saddle tube 2 and of a horizontal tube 4, the ends of which are assembled by welding to the upper end of the saddle tube 2 and respectively to a globally vertical fork tube 5, the oblique tube 3 being moreover secured to said fork tube 5 also by welding.

Said ATB moreover includes a swing arm 15 consisting of two V-shaped assemblies 15a, 15b extending on either side of the middle plane of the frame 1. Each assembly 15a, 15b of the swing arm 15 consists of an oblique tube 16, a so-called stay, and of a lower tube 17 connected two by two by welds. The intersection of the stay 16 and of the lower tube 17 bears the axle of the hub of the rear wheel not shown in FIG. 4.

Said swing arm 15 is secured to the frame 1 by two articulation means 23 and 24.

The first articulation means 23 consists in a so-called lower connecting rod 23, the axes of rotation 23a and 23b of which, positioned at the free ends of said connecting rod 23, are articulated to the distal end of the lower tube 17 of the swing arm 15 and to the saddle tube 2 close to the crankset bottom bracket 12, just above the latter, respectively. This lower connecting rod 23 globally extends horizontally at the rear of the saddle tube 2 of the frame 1 of the ATB when the latter is in the position of static equilibrium, i.e. when an average weight cyclist takes up position on the saddle of the ATB. More specifically, said lower connecting rod 23 is slightly tilted from top to bottom and from front to rear, forming an angle α comprised between 10 and 30°, and preferably of about 20°, with the horizontal H illustrated in dotted lines in FIG. 1.

The second articulation means 24 consists in a so-called upper connecting rod 24, the axes of rotation 24a and 24b of which, positioned at the free ends of said upper connecting rod 24, are articulated to the distal end of the stay 16 of the swing arm 15 and to the frame 1, respectively. The axis of rotation 24b of the connecting rod 24 is articulated to the intersection of the saddle tube 2 and of the horizontal tube by means of tabs 28. This upper connecting rod 24 globally extends vertically between the saddle tube 2, the horizontal tube 4 and the oblique tube 3 of the frame 1 of the ATB when the latter is in the position of static equilibrium. More specifically, said upper connecting rod 24 is tilted from top to bottom and from rear to front, forming an angle β comprised between 10 and 20°, and preferably of about 10° with the vertical V illustrated in dotted lines in FIG. 4.

The ATB frame 1 according to the invention illustrated in FIG. 4 is in the unloaded position so that in the position of static equilibrium, the orientation of the connecting rods 23 and 24 may differ from the orientation illustrated in the figure according to an angle which may reach 5°.

In the same way as earlier, the instantaneous centre of rotation 25 defined by the intersection of the straight lines $d_1$ and $d_2$ passing through the axes 23a, 23b of the lower connecting rod 23 and through the axes 24a, 24b of the upper connecting rod 24, respectively, is located in the upper front quadrant of the frame 1.

Moreover, in the position of static equilibrium, said instantaneous centre of rotation 25 is located on the straight line extending on from the upper strand of the transmission chain not shown in FIG. 4.

Moreover, when the rear wheel encounters an obstacle, the instantaneous centre of rotation 25 then moves forwards along a slightly curvilinear trajectory, i.e. a curvilinear trajectory having a large radius of curvature, the concavity of which is oriented upwards.

Finally, the ATB comprises a shock absorber 26, the free ends of which are secured to the oblique tube 3 and to the distal end of the stay 16 of the swing arm 15 or to the upper connecting rod 24, respectively.

It will be observed with reference to FIG. 5, that the trajectory of the rear wheel when the latter encounters an obstacle, is a curvilinear curve which does not include any inflection point and the concavity of which is oriented towards the front of the ATB. The length of the chain line, called CSL (Chain Stay Length) constantly increases depending on the displacement D of the rear wheel. Moreover, with reference to FIG. 6, the first derivative of the chain stay length relatively to the displacement, i.e.

$$\frac{d(CSL)}{d(D)}$$

is a strictly positive and globally linearly increasing curve. Further, the second derivative of the length of the chain line CSL relatively to the displacement, i.e.

$$\frac{d^2(CSL)}{d(D)^2}$$

is a strictly positive, decreasing curve for a displacement comprised between 0 and 60 mm and increasing for a displacement comprised between 60 and 160 mm.

Such characteristics show that a kick-back phenomenon may occur when the rear wheel encounters an obstacle. By kick-back is meant the phenomenon of rotation of the pedals in the opposite direction due to an increase in the tension of the upper length of the chain. Nevertheless, as the increase in the length of the chain is small, this kick-back phenomenon is not perceived by the cyclist with the suspension according to the invention.

According to a last alternative embodiment, not shown in the figures, the first articulation means 23 may consist in a so-called lower connecting rod 23, the axes of rotation 23a and 23b of which, positioned at the free end of said connecting rod 23, are articulated to the distal end of the lower tube 17 of the swing arm 15 and to the saddle tube 2 close to the crankset bottom bracket 12, respectively, at the axis of the crankset bottom bracket 12, i.e. the axis of rotation 23b is either coincident with the axis of the crankset bottom bracket 12 or positioned on the horizontal line H passing through the axis of said crankset bottom bracket 12, or located under the axis of the crankset bottom bracket 12. In this alternative embodiment, the crankset bottom bracket 12 includes in its rear portion a member able to receive the axis of rotation 23b of the lower connecting rod 23.

One skilled in the art may easily change the dimensions and the trajectory of the articulation means 21, 24 in order to obtain trajectory of the instantaneous centre of rotation 25 so that it moves inside a horizontal band and so that the distance between said instantaneous centre of rotation 25 and the upper strand of the transmission chain 21, or the straight line which extends an from it, increases when the swing arm 15 moves upwards. One skilled in the art may notably be assisted by a computer program in which he/she may integrate different constraints such as the dimensions of the frame 1 and of the swing arm 15, the shape of the frame 1 and of the swing arm 15, the position of the different articulation means 23, 24 of the swing arm 15 on the frame 1 relatively to the crankset bottom bracket 12, etc.

Finally, it is obvious that the rear suspension according to the invention may be adapted to any kinds of vehicles including a chassis, a swing arm bearing the axle of the hub of at least one driving wheel, articulated to the chassis and a shock absorber, the ends of which are secured to the chassis and to the swing arm, respectively, such as a motor bicycle, a quad or the like and that the examples which have just been given, are only particular illustrations which are by no means limiting as to the fields of application of the invention.

The invention claimed is:

1. A rear suspension of a bicycle including
    a rear swing arm coupled to a hub of a rear wheel and articulated by at least two articulation means to a frame bearing a crankset bottom bracket, said bicycle including a transmission chain extending between a driving sprocket wheel secured to the crankset bottom bracket and a driven sprocket wheel secured to the axle of the hub of the rear wheel, and the swing arm pivoting around an instantaneous center of rotation corresponding to the intersection of straight lines passing through the axes of rotation of each of the articulation means of the swing arm,
    wherein said instantaneous center of rotation is located close to a straight line co-linear with an upper strand of the chain, in a position of static equilibrium and moves forward inside a horizontal band so that said instantaneous centre of rotation moves horizontally when the swing arm moves upwards upon going over an obstacle, and
    wherein the swing arm and articulation means of the swing arm are configured so that a distant between said instantaneous center of rotation and the straight line co-liner with the upper strand of the chain increases when the swing arm moves upwards to create a restoring moment which tends to bring the swing arm back into the position of static equilibrium, said restoring moment being proportional to a tension of the upper strand of the transmission chain on the one hand and to the distance separating the instantaneous center of rotation from the upper strand of the transmission chain or from the straight line co-linear with the upper strand of the chain on the other hand, is created.

2. The rear suspension according to claim 1, wherein the band is delimited by an upper straight line and a lower straight line extending above and respectively below the co-linear straight line in the position of static equilibrium.

3. The rear suspension according to claim 2, wherein the distance separating the upper straight line from the lower straight line of the band is less than or equal to half the maximum vertical displacement of the hub of the rear wheel.

4. The rear suspension according to claim 1, wherein the instantaneous center of rotation is located in a front quadrant relative to the crankset bottom bracket.

5. The suspension according to claim 1, wherein the distance between said instantaneous center of rotation and the straight line co-linear with the upper strand of the chain increases linearly when the swing arm moves upwards.

6. The rear suspension according to claim 1, wherein the instantaneous center of rotation follows a linear trajectory when the swing arm moves.

7. The rear suspension according to claim 1, wherein the distance between said instantaneous center of rotation and the straight line co-linear with the upper strand of the chain increases non-linearly when the swing arm moves upwards.

8. The rear suspension according to claim 7, wherein the instantaneous center of rotation follows a curvilinear trajectory, the concavity of which is oriented upwards when the swing arm moves.

9. The rear suspension according to claim 1, wherein the articulation means of the swing arm includes an upper connecting rod articulated to the saddle tube of the frame and a lower connecting rod articulated to said saddle tube close to the crankset bottom bracket.

10. The rear suspension according to claim 9, wherein the lower connecting rod extends horizontally in a position of static equilibrium.

11. The rear suspension according to claim 9, wherein the upper connecting rod extends vertically in a position of static equilibrium.

* * * * *

UNITED STATES PATENT AND TRADEMARK OFFICE
CERTIFICATE OF CORRECTION

PATENT NO.      : 8,857,842 B2                                              Page 1 of 1
APPLICATION NO. : 13/456150
DATED           : October 14, 2014
INVENTOR(S)     : Emmanuel Antonot It is certified that error appears in the above-identified patent and that said Letters Patent is hereby corrected as shown below:

On the Title Page, in Item [56] References Cited, under Foreign Patent Documents, please delete "EP 026073" and insert --EP 1026073--.

In the Claims,

Column 9, Claim 1, line 49, please delete "distant" and insert --distance--.

Column 10, Claim 1, line 1, please delete "co-liner" and insert --co-linear--.

Column 10, Claim 1, line 7, please delete "the distance" and insert --a distance--.

Signed and Sealed this
Seventh Day of April, 2015

Michelle K. Lee
*Director of the United States Patent and Trademark Office*